(12) United States Patent
Kim et al.

(10) Patent No.: US 9,796,822 B2
(45) Date of Patent: Oct. 24, 2017

(54) OPTICAL FILMS, RETARDATION FILMS, AND LIQUID CRYSTAL DISPLAY COMPRISING THE SAME

(75) Inventors: Hee-Jung Kim, Daejeon (KR); Dong-Ryul Kim, Daejeon (KR); Young-Whan Park, Daejeon (KR); Dae-Woo Nam, Daejeon (KR); Boong-Goon Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 460 days.

(21) Appl. No.: 12/450,735

(22) PCT Filed: Apr. 14, 2008

(86) PCT No.: PCT/KR2008/002088
§ 371 (c)(1),
(2), (4) Date: Oct. 9, 2009

(87) PCT Pub. No.: WO2008/127053
PCT Pub. Date: Oct. 23, 2008

(65) Prior Publication Data
US 2010/0060827 A1    Mar. 11, 2010

(30) Foreign Application Priority Data

Apr. 13, 2007  (KR) .................. 10-2007-0036540
Apr. 30, 2007  (KR) .................. 10-2007-0042080

(51) Int. Cl.
*G02F 1/1335*    (2006.01)
*C08J 5/18*       (2006.01)
(Continued)

(52) U.S. Cl.
CPC ............ *C08J 5/18* (2013.01); *C08F 293/00* (2013.01); *C08F 293/005* (2013.01);
(Continued)

(58) Field of Classification Search
CPC ...... C08G 77/04; C08G 77/045; C08G 77/06; C08G 77/08; C08G 77/14; C08G 77/18;
(Continued)

(56) References Cited

U.S. PATENT DOCUMENTS 3,665,052 A * 5/1972 Saam et al. .................. 525/106
3,890,405 A * 6/1975 Kendrick et al. ............ 525/106
(Continued)

FOREIGN PATENT DOCUMENTS

EP    1278079 A1    1/2003
EP    1 489 437     12/2006
(Continued)

OTHER PUBLICATIONS

Morgan, Andre Michelle, Synthesis of Polydimethylsiloxane-b-Polystyrene Copolymers by Combined Anionic Ring-Opening Polymerization and Nitroxide-Mediated Radical Polymerization, May 2002, ProQuest Infomation and Learning, Howard University Disseration pp. 1-138.*

(Continued)

*Primary Examiner* — Eli D Strah
(74) *Attorney, Agent, or Firm* — Dentons US LLP

(57) ABSTRACT

The present invention relates to an optical film that comprises a block copolymer that comprises a vinyl polymer block containing styrene or a derivative thereof, and a poly-dimethylsiloxane block, a retardation film using the same, a method of manufacturing them, and a liquid crystal display comprising the films.

9 Claims, 2 Drawing Sheets

(51) Int. Cl.
*C08F 293/00* (2006.01)
*C08G 77/388* (2006.01)
*G02B 5/30* (2006.01)

(52) U.S. Cl.
CPC .......... *C08G 77/388* (2013.01); *G02B 5/3083* (2013.01); *B32B 2457/202* (2013.01); *C08J 2353/00* (2013.01); *G02F 1/133528* (2013.01); *G02F 2201/50* (2013.01); *G02F 2202/022* (2013.01); *Y10T 428/1036* (2015.01); *Y10T 428/1045* (2015.01)

(58) Field of Classification Search
CPC ...... C08G 77/20; C08G 77/42; C08G 77/442; C08G 81/024; C08G 2261/126; C08G 77/388; B29K 2025/08; B29K 2995/0032; C08L 83/10; G02F 2202/40; G02F 2413/00; G02F 1/0063; G02F 1/13363; G02F 1/133528; G02F 2201/50; G02F 2202/022; C08J 5/18; C08J 2353/00; C08F 293/00; C08F 293/005; Y10T 428/1045; Y10T 428/1036; G02B 5/3083; B32B 2457/202
USPC .................... 252/299.01; 349/135, 117–121; 524/505, 858, 860, 863, 864, 700, 730, 524/731; 525/88, 106; 428/1.3, 1.31, 428/1.32, 1.33, 1.5, 1.51, 1.52, 1.55
See application file for complete search history.

(56) References Cited

U.S. PATENT DOCUMENTS

| | | | |
|---|---|---|---|
| 3,975,455 A | 8/1976 | Falender et al. | |
| 4,550,139 A * | 10/1985 | Arkles | 525/90 |
| 4,883,344 A * | 11/1989 | Okada et al. | 349/135 |
| 5,296,574 A * | 3/1994 | Hoxmeier | 528/25 |
| 5,574,163 A | 11/1996 | Luzzi | |
| 6,720,061 B1 * | 4/2004 | Port et al. | 428/156 |
| 2002/0169267 A1 | 11/2002 | Minakuchi et al. | |
| 2003/0190437 A1 | 10/2003 | Verrall et al. | |
| 2003/0207983 A1 * | 11/2003 | Sone et al. | 524/505 |
| 2004/0063887 A1 | 4/2004 | Toyomasu et al. | |
| 2004/0147674 A1 * | 7/2004 | Kakeda et al. | 525/88 |
| 2004/0167239 A1 * | 8/2004 | DeSimone | C08J 9/26 521/62 |
| 2005/0224754 A1 * | 10/2005 | Hirai et al. | 252/299.01 |
| 2006/0167191 A1 * | 7/2006 | Sasaki et al. | 525/474 |
| 2007/0076155 A1 * | 4/2007 | Nakayama et al. | 349/118 |
| 2007/0196592 A1 * | 8/2007 | Ono | 428/1.1 |

FOREIGN PATENT DOCUMENTS

| | | | |
|---|---|---|---|
| GB | 1353502 A | 5/1974 | |
| JP | 2000-162436 | 6/2000 | |
| JP | 2000-304925 | 11/2000 | |
| JP | 2003-207640 | 7/2003 | |
| JP | 2005-309382 | 11/2005 | |
| KR | 10-2004-0029251 | 4/2004 | |
| KR | 10-0484085 | 4/2005 | |
| KR | 10-2006-0041921 | 5/2006 | |
| KR | 10-0659130 | 12/2006 | |
| WO | WO 2005/100457 | 10/2005 | |
| WO | WO 2005100457 A1 * | 10/2005 | ............ C08J 5/18 |
| WO | WO 2006013869 A1 * | 2/2006 | ............ G02B 5/30 |

OTHER PUBLICATIONS

Zhao et al., "Superhydrophobic Surface from Vapor-Induced Phase Separation of Copolymer Micellar Solution", Macromolecules 2005, pp. 8996-8999.
Database WPI Week 200663, Thomson Scientific, London, GB. AN 2006-604920; XP002620443, & JP 2006-195242 A (Fuji Photo Film Co, Ltd) Jul. 27, 2006.
Rossi et al.: Synthesis of poly(styrene-block-methylphenylsilane-block-styrene) via TEMPO-mediated controlled free radical polymerization:, Polymer International, vol. 53, No. 4, Apr. 1, 2004, pp. 465-471, XP002620444.
Morgan et al.: "Synthesis and Multidimensional NMR Characterization of PDMS-b-PS Prepared by Combined Anionic Ring-Opening and Nitroxide-Mediated Radical Polymerization", Marcromolecules, vol. 35, May 21, 2002, pp. 4238-4246, XP002620445.

* cited by examiner

[Fig. 1]
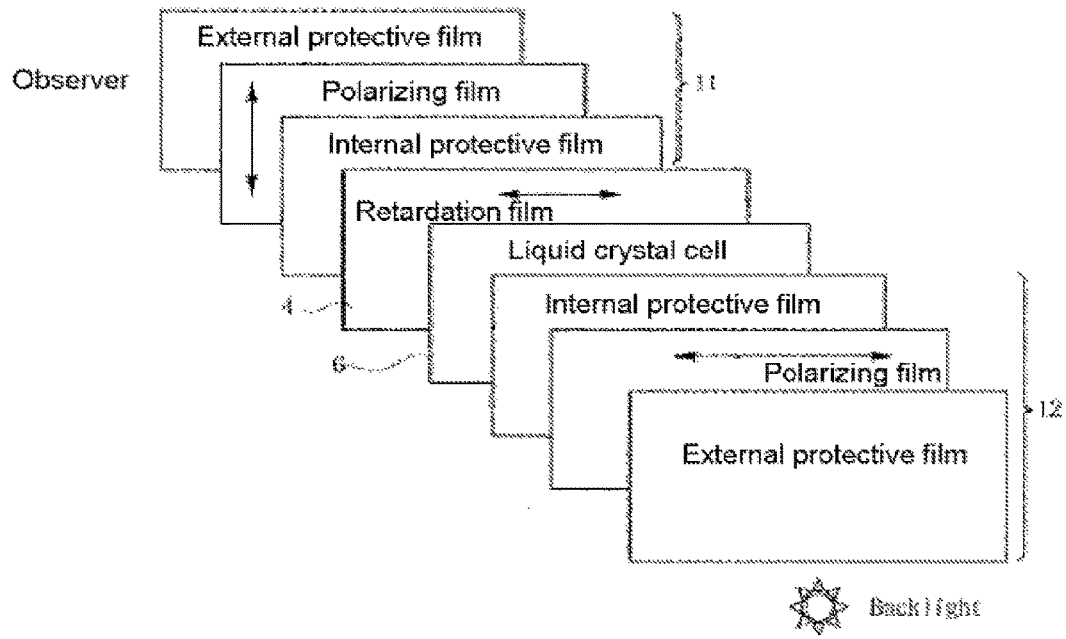
[Fig. 2]
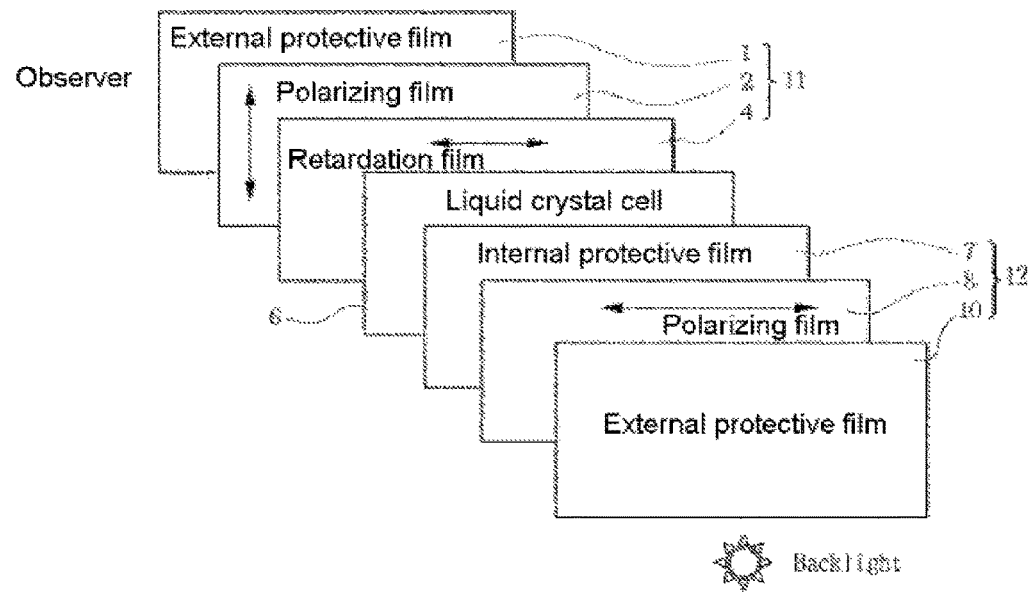

[Fig. 3]
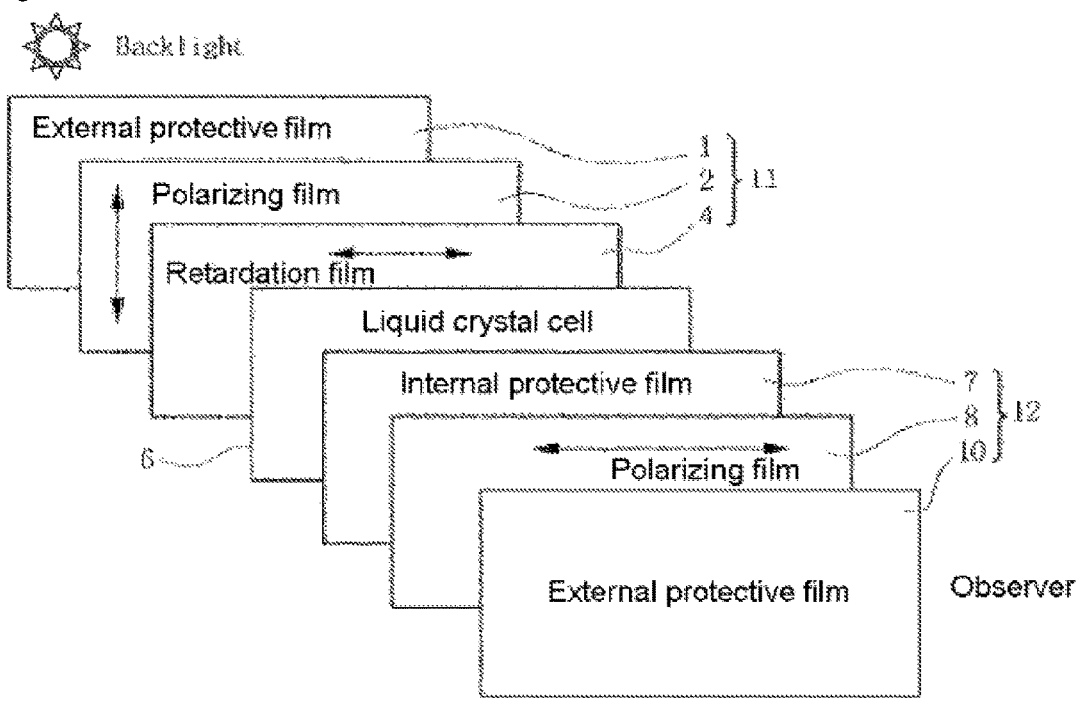

OPTICAL FILMS, RETARDATION FILMS, AND LIQUID CRYSTAL DISPLAY COMPRISING THE SAME

This application claims the benefit of PCT/KR2008/002088 filed on Apr. 14, 2008 along with Korean Patent Application No. 10-2007-0036540 filed on Apr. 13, 2007 and Korean Patent Application No. 10-2007-0042080 filed on Apr. 30, 2007, all of which are hereby incorporated herein by reference for all purposes in their entirety.

TECHNICAL FIELD

The present invention relates to an optical film, a retardation film using the optical film, a method of manufacturing the optical and retardation films, and a liquid crystal display comprising the optical and retardation films.

This application claims priority from Korean Patent Application Nos. 10-2007-0036540 filed on Apr. 13, 2007 and 10-2007-0042080 filed on Apr. 30, 2007 in the Korean Intellectual Property Office, the disclosure of which is incorporated herein by reference in its entirety.

BACKGROUND ART

Styrene resins are advantageous in that economic efficiency is excellent due to low-priced monomers used to prepare the resins and the transparency is excellent. Films which are produced by using the styrene resins are materials having the optical isotropy increasing the refractive index in a direction perpendicular to the alignment direction when the films are stretched and aligned, and considered materials useful to prepare a film having a positive thickness retardation ($R_{th}$) value by using the stretching.

However, the film that is manufactured by using the styrene resins are disadvantageous in that the heat resistance and the mechanical properties are poor, with the exception of when the resins are prepared in conjunction with costly special monomers. If the resins are blended with amorphous polyester blocks in order to avoid the disadvantages of the styrene resin, performance of the resulting composition is reduced due to low compatibility.

Meanwhile, in respects to the production of retardation films, Japanese Unexamined Patent Application Publication Nos. 2000-162436 and 2000-304925 disclose a process of producing a retardation film, which includes attaching an inverse shrinkable film to a film of a thermoplastic resin to perform stretching. However, in the process, it is difficult to control the refractive index in order to increase the z-axis direction refractive index.

Korean Registered Patent No. 0484085 discloses a process of providing a z-axis direction refractive index by using a combined substance of optical devices including one or more optical retardation films and one or more broadband reflective polarizers. However, this patent requires a complicated process.

Korean Unexamined Patent Application Publication No. 2004-29251 discloses a process of providing a z-axis direction refractive index, which includes forming a film by using a copolymer obtained by copolymerizing olefin and N-phenyl substituted maleimide and uniaxially or biaxially stretching the film. However, the patent is disadvantageous in that since material having a high glass transition temperature is used, a stretching process is performed at a high temperature of 220° C. or more and the thickness retardation ($R_{th}$) of the film having a thickness of 100 μm after +50% stretching is undesirably controlled to be 100 nm or less.

DISCLOSURE OF INVENTION

Technical Problem

The present inventors found that when a block copolymer provided in the present invention is used as material of an optical film, an optical film having excellent transparency, heat resistance, and mechanical properties can be obtained. Furthermore, the present inventors found that when the optical film provided in the present invention is uniaxially or biaxially stretched, a retardation film having excellent transparency, heat resistance, and mechanical properties can be obtained.

Accordingly, it is an object of the present invention to provide an optical film that is obtained using a block copolymer, a process of producing the optical film, and a liquid crystal display comprising the optical film.

It is another object of the present invention to provide a retardation film which has excellent physical properties such as transparency, heat resistance, and mechanical properties due to characteristics of a styrene resin and a polydimethylsiloxane block which are obtained using uniaxial or biaxial stretching of the optical film, a process of producing the retardation film, and a liquid crystal display comprising the retardation film.

Technical Solution

The present invention provides an optical film that comprises a block copolymer that comprises a vinyl polymer block containing styrene or a derivative thereof, and a polydimethylsiloxane block.

In addition, the present invention provides a method of manufacturing an optical film, which comprises 1) preparing a block copolymer that comprises a vinyl polymer block containing styrene or a derivative thereof, and a polydimethylsiloxane block; and 2) forming a film by using the block copolymer.

In addition, the present invention provides a liquid crystal display that comprises one or more optical films.

In addition, the present invention provides a retardation film that comprises a block copolymer that comprises a vinyl polymer block containing styrene or a derivative thereof, and a polydimethylsiloxane block.

In addition, the present invention provides a method of manufacturing a retardation film, which comprises 1) preparing a block copolymer that comprises a vinyl polymer block containing styrene or a derivative thereof, and a polydimethylsiloxane block; 2) forming a film by using the block copolymer; and 3) uniaxially or biaxially stretching the film.

In addition, the present invention provides a liquid crystal display that comprises one or more retardation films.

In addition, the present invention provides an integrated polarizing plate that comprises a polarizing film; and a retardation film that comprises a block copolymer that comprises a vinyl polymer block containing styrene or a derivative thereof, and a polydimethylsiloxane block on a side or both sides of the polarizing film as a protective film.

In addition, the present invention provides a liquid crystal display that comprises the integrated polarizing plate.

Advantageous Effects

The present invention provides an optical film having excellent transparency, heat resistance, and mechanical strength, which is produced using a block copolymer of a vinyl polymer block and a polydimethylsiloxane block. In addition, a retardation film which is produced using uniaxial or biaxial stretching of the film according to the present invention and has a retardation so that $R_{th}$ is larger than 0 and $R_{in}$ is 0 or $R_{th}$ is larger than 0 and $R_{in}$ is not 0 does not have disadvantages of the styrene resin, but excellent transparency, heat resistance and mechanical strength. Thus, high contrast characteristics and a low change in color of liquid crystal displays are ensured.

BRIEF DESCRIPTION OF THE DRAWINGS

FIG. 1 is a view schematically illustrating a structure of a liquid crystal display comprising a retardation film according to the present invention;

FIG. 2 is a view schematically illustrating a structure of a liquid crystal display comprising an integrated polarizing plate according to the present invention; and FIG. 3 is a view schematically illustrating a structure of a liquid crystal display comprising an integrated polarizing plate according to the present invention.

REFERENCE NUMERALS

1: External protective film
2: Polarizing film
4: Retardation film
6: Liquid crystal cell
7: Internal protective film
8: Polarizing film
10: External protective film
11: First polarizing plate
12: Second polarizing plate

BEST MODE FOR CARRYING OUT THE INVENTION

Hereinafter, the present invention will be described in detail.

An optical film according to the present invention comprises a block copolymer that comprises a vinyl polymer block containing styrene or a derivative thereof, and a polydimethylsiloxane block.

In the optical film according to the present invention, a styrene monomer used to prepare the vinyl polymer block may be represented by the following Formula 1.

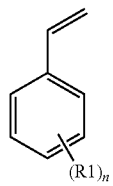

[Formula 1]

In Formula 1,

R1s may be same or different from each other and are each independently hydrogen; a hydrocarbon radical selected from alkyl having 1 to 20 carbon atoms, aryl, alkylaryl, and arylalkyl; halogen; nitro; or alkoxy; and may form a condensation ring in conjunction with adjacent groups, and n is an integer in the range of 0 to 5.

Specific examples of the styrene monomer include one or more compounds selected from styrene, α-methylstyrene, 3-methylstyrene, p-methylstyrene, p-ethylstyrene, p-propylstyrene, 4-(p-methylphenyl)styrene, 1-vinylnaphthalene, p-chlorostyrene, m-chlorostyrene, and p-nitrostyrene. It is preferable to use styrene or methylstyrene. However, examples of the styrene monomer are not limited thereto.

The vinyl polymer block may further contain other monomers, in addition to the above-mentioned styrene monomer. Specific examples of the other monomers may include a (meth)acrylic ester compound, a vinyl cyanide compound, and a maleimide compound, but are not limited thereto.

Specific examples of the (meth)acrylic ester compound may include methyl methacrylate, ethyl methacrylate, methyl acrylate, ethyl acrylate, butyl acrylate, 2-ethylhexyl methacrylate, lauryl methacrylate, and benzyl methacrylate, but are not limited thereto.

Specific examples of the vinyl cyanide compound may include acrylonitrile, but are not limited thereto.

Specific examples of the maleimide compound may include N-phenylmaleimide, N-cyclohexylmaleimide, N-methylmaleimide, and N-butylmaleimide, but are not limited thereto.

Examples of the monomers which may be added to styrene or the derivative thereof include vinyl monomers that are capable of being copolymerized with styrene or the derivative thereof and preferably vinyl monomers that are capable of being copolymerized using radical polymerization, but are not limited thereto.

In addition, it is preferable that styrene or the derivative thereof be included in an amount in the rage of 50 to 100 mol % in the vinyl polymer block in order to have an optical property.

In the optical film awarding to the present invention, the polydimethylsiloxane block may be generally obtained by reacting dimethyldichlorosilane and dimethylhydrochlorosilane to include a hydrosilyl group, and α-olefin having 4 to 18 carbon atoms may be subjected to the hydrosilylation reaction to obtain the polydimethylsiloxane block that is represented by the following Formula 2.

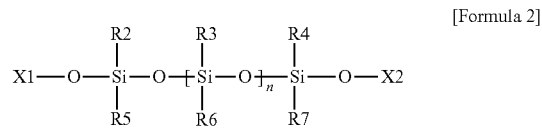

[Formula 2]

In Formula 2,

R2, R3, R4, R5, R6, and R7 are same or different from each other, and are each independently alkyl having 1 to 12 carbon atoms, arylalkyl having 6 to 12 carbon atoms, or aryl having 6 to 12 carbon atoms, X1 and X2 are same or different from each other, and are each independently alkyl having 1 to 12 carbon atoms, arylalkyl having 6 to 12 carbon atoms, or aryl having 6 to 12 carbon atoms, and n is an integer of 1 or more.

In Formula 2, X1 and X2 may be further bonded to an end group that is selected from hydroxy, amine, isocyanate, and epoxy.

The block copolymer according to the present invention may be a A-(B-A)$_n$-B type, a A-(B-A)$_m$ type, or a mixture type. In this connection, A is a polydimethylsiloxane block, B is a vinyl polymer block, n is an integer in the range of 0 to 3, and m is an integer in the range of 1 to 3.

In addition, in the block copolymer, a weight ratio of the polydimethylsiloxane block and the vinyl polymer block is preferably in the range of 90:10 to 5:95, but is not limited thereto.

In addition, the optical film according to the present invention may further comprise a compound that includes a nitroxide radical.

Representative examples of the compound that includes the nitroxide radical may include TEMPO (2,2,6,6-tetramethylpiperidine-1-oxyl), and MTEMPO (2,2,4,6,6-pentamethylpiperidine-1-oxyl), and a compound that is represented by the following Formula 3 may be used.

[Formula 3]

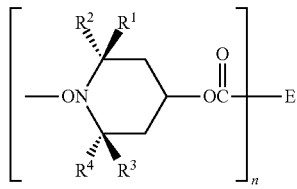

In Formula 3, n is 1, 2, 3 or 4, $R^1$, $R^2$, $R^3$, and $R^4$ may be same or different from each other, and are each independently methyl or ethyl, or $R^1$ and $R^2$, or $R^3$ and $R^4$ may form pentamethylene, when n is 1, E is $C_1$~$C_{19}$ alkyl, $C_2$~$C_{17}$ alkenyl, phenyl, or phenyl in which 1 to 3 $C_1$~$C_4$ alkyls are substituted, when n is 2, E is $C_2$~$C_{12}$ alkylene, ortho phenylene, metal phenylene, or para phenylene, when n is 3, E is $C_3$~$C_7$ alkanetriyl, 1,2,4-benzenetriyl, or 1,3,5-benzenetriyl, and when n is 4, E is $C_4$~$C_8$ alkanetetrayl, or 1,2,4,5-benzenetetrayl.

The compound that includes the nitroxide radical represented by Formula 3 is known by U.S. Pat. No. 5,574,163.

A method of preparing the block copolymer that comprises the vinyl polymer block containing styrene or the derivative thereof, and the polydimethylsiloxane block according to the present invention may be performed according to the following procedure, but is not limited thereto.

First, through the reaction between the compounds including polydimethylsiloxane having an end substituted with alkylhydroxy or alkylamine and the compounds including azo initiator group, the polydimethylsiloxane block having the azo group is prepared and it is used as an initiator during the polymerization of vinyl to perform the radical polymerization, thus obtaining the block copolymer according to the present invention.

Second, the radical polymerization in respects to styrene is performed by using the initiator having an end substituted with carboxylic acid, acylchloride, or hydroxy amine. During this process, in order to control the molecular weight of polystyrene, the initiator is added in an amount in the range of 1 to 30 mol %, and more preferably 1 to 20 mol %, thereby performing the polymerization. Polystyrene that is obtained by this process is reacted with the polydimethylsiloxane having an end treated with hydroxy, amine, isocyanate, or carboxylic acid to prepare the block copolymer according to the present invention.

In the present invention, the compound that includes the nitroxide radical is added during the preparation of the block copolymer to increase the polymerization conversion ratio of styrene during the preparation of the block copolymer. Additionally, the size of domain of polydimethylsiloxane can be controlled to prepare an optical film and a retardation film at low cost. In connection with this, the compound that includes the nitroxide radical is reacted with the radical that is generated from the azo compound to be maintained in a stable state at a predetermined temperature or less, but is separated into the radical at a predetermined temperature or more to allow living polymerization to be performed in the polymerization solution. Accordingly, a predetermined concentration of radical is added to the polymerization solution to continuously perform the polymerization.

In the present invention, the amount of the compound that includes the nitroxide radical added be in the range of 0.5 to 1 equivalent based on the mole number of azo in the polydimethylsiloxane macro ax compound to be added. In the case of when the amount is less than 0.5, it is difficult to control the molecular weight. In the case of when the amount is more than 1, since the pure vinyl polymer is formed due to the nitroxide radical, physical properties of the obtained block copolymer may be reduced.

Furthermore, a method of manufacturing the optical film according to the present invention comprises the steps of 1) preparing a block copolymer comprising a vinyl polymer block containing styrene or a derivative thereof, and a polydimethylsiloxane block, and 2) forming a film using the block copolymer.

In the method of manufacturing the optical film according to the present invention, the block copolymer of step 1) may be a block copolymer that is manufactured by adding the compound including the nitroxide radical.

As to the optical film of the present invention, the size of the vinyl polymer block and the size of the polydimethylsiloxane block of the block copolymer may be controlled to use the block copolymer having various types of compositions and average molecular weights as material.

When the film is produced by using the block copolymer, the optical film may be produced by using the block copolymer having the standard reduced weight average molecular weight of polystyrene in the range of 5,000 to 1,000,000 according to primary molding processes such as an extrusion molding process, an inflation molding process, or a solvent casting process which is a typical film production process.

The optical film may be industrially used without any modification, or may be subjected to an additional stretching process which is a secondary molding process to be converted into a retardation film having retardation.

When the film is produced by using the extrusion molding process as the primary molding process, the film may pass through a small space between T-dies to have a predetermined thickness. In this connection, it is preferable to heat and dry the block copolymer at a temperature in the range of 80 to 130° C. in advance so as to prevent an undesirable appearance due to bubbling of gas. As to the condition of the extrusion molding process, it is preferable to perform the molding process at a temperature that is sufficiently higher than a glass transition temperature at which the block copolymer is melted and then starts to flow at a shearing rate of less than 1000/sec in order to suppress alignment of the molecular chain. In order to perform cooling and solidification of the molten film after the film passes through the die, a low-temperature metal roller or a steel belt may be used.

When the film is produced by using the solvent casting process as the primary molding process, a solvent which is capable of dissolving the block copolymer is selected, and a plurality of solvents may be used if necessary. Specific examples of the solvent which is capable of being used during the solvent casting process include, but are not limited to methylene chloride, chloroform, chlorobenzene, 1,4-dioxane, 1,3-dioxolane, and tetrahydrofuran. In particular, a good solvent and a poor solvent in respects to the block copolymer may be combined with each other in order to control a volatilization speed. As to the drying of the substrate by using the solvent casting process, it is preferable that the concentration of the residual solvent be 0.1 wt % or less so as to prevent bubbles or internal voids from being formed in the film by adjusting the heating condition.

It is preferable that the optical film produced by using the primary molding process have a thickness in the range of 30 to 500 µm.

In addition, the present invention provides a liquid crystal display which comprises one or more optical films.

The optical film may be used as a protective film of the polarizing plate constituting the liquid crystal display.

The liquid crystal display may be manufactured by using a general method that is known in the art, except that the optical film according to the present invention is comprised.

In addition, the retardation film according to the present invention comprises a block copolymer that comprises a vinyl polymer block having styrene or a derivative thereof, and a polydimethylsiloxane block.

The retardation film according to the present invention may further comprise a compound including a nitroxide radical.

Furthermore, a method of producing a retardation film according to the present invention comprises the steps of 1) preparing a block copolymer comprising a vinyl polymer block containing styrene or a derivative thereof, and a polydimethylsiloxane block, 2) forming a film using the block copolymer, and 3) uniaxially or biaxially stretching the film.

In the method of producing the retardation film according to the present invention, the block copolymer of step 1) may be a block copolymer that is prepared by adding the compound including the nitroxide radical.

As to the optical film, the retardation film has a specific function and thus is used for the specific purpose. The three dimensional refractive index of the retardation film is controlled to be different from that of the optical film. The film, which is produced by using the block copolymer prepared by using the above-mentioned process according to the extrusion molding process, the inflation molding process, or the solvent casting process, is uniaxially or biaxially stretched to have optical properties that $R_{th}>0$ and $R_{in}=0$, or to produce the retardation film having optical properties that $R_{th}>0$ and $R_{in}\neq 0$. In general, the biaxial stretching is performed so that stretching ratios of two axes are the same as each other to produce the retardation film having the optical properties that $R_{th}>0$ and $R_{in}=0$. Furthermore, the uniaxial stretching is performed, or the biaxial stretching is performed so that stretching ratios of two axes are different from each other to produce the retardation film having the optical properties that $R_{th}>0$ and $R_{in}\neq 0$. Additionally, in consideration of the retardation which may be provided when the film is produced by using the solvent casting process or the extrusion molding process, desirable $R_{th}$ and $R_{in}$ values are provided according to the purpose. In this connection, when a stretching direction of the film plane is an x axis, a transverse direction in respects to the film plane is a y axis, and a perpendicular direction (thickness direction) in respects to the film plane is a z axis, the x-axis direction refractive index is called $n_x$, the y-axis direction refractive index is called $n_y$, and the z-axis direction refractive index is called $n_z$. $R_{th}$ denotes the thickness retardation value and is obtained by using the equation $R_{th}=d\times(n_z-n_y)$. Furthermore, $R_{in}$ denotes the in-plane retardation value and is obtained by using the equation $R_{in}=d\times(n_x-n_y)$ (d is the thickness of the film). As to the uniaxial stretching process, the uniaxial stretching process such as the free width uniaxial stretching or the constant width uniaxial stretching is performed to produce the retardation film. Furthermore, in respects to the biaxial stretching process, the biaxial stretching process such as sequential biaxial stretching and simultaneous biaxial stretching may be performed to produce the retardation film.

During the stretching process of the secondary molding performed to obtain the retardation film, it is preferable to perform the stretching process at a temperature in the range of a temperature that is lower than a glass transition temperature of the block copolymer by 20° C. to a temperature that is higher than the glass transition temperature of the block copolymer by 30° C. The glass transition temperature means a temperature in the range of a temperature at which the storage elasticity of the block copolymer starts to be reduced to allow the loss elasticity to be higher than the storage elasticity to a temperature at which the alignment of the polymer chains becomes loose and thus vanishes. The glass transition temperature may be measured by using a differential scanning calorimeter (DSC). It is preferable to stretch the film so that the stretching speed be in the range of 10 to 100 mm/min and the stretching ratio be in the range of 10 to 200%. The stretching ratio is defined by the following equation: stretching ratio (%)=(length of sample after stretching−length of sample before stretching)/(length of sample before stretching)×100.

In order to realize uniform birefringence of the film obtained after the stretching process, it is preferable that the film obtained by using the primary molding process does not have nonuniform alignment or residual distortion and be optically isotropic. To achieve this, it is preferable to perform the solvent casting process as the film formation process. Preferably, in the film which is produced by using the solvent casting process as the primary molding process, the concentration of residual solvent is 0.1 wt % or less when the stretching process is performed as the secondary molding process. When the film is produced by using the extrusion molding process as the primary molding process, it is preferable to perform heat treatment at a temperature that is higher than the glass transition temperature by 30° C. so as to loose the alignment of the polymer chains.

The retardation film which is produced by using the secondary molding process preferably has a thickness in the range of 30 to 300 µm. It is preferable that the in-plane retardation value of the retardation film be 0 to +500 nm and the thickness retardation value be 0 to +500 nm.

In addition, the present invention provides a liquid crystal display comprising one or retardation films The retardation film which is produced according to the present invention is preferably used as an optical compensation member for liquid crystal displays. Examples of the retardation film may include a retardation film such as a STN (Super Twist Nematic) type LCD, a TFT-TN (Thin Film Transistor-Twisted Nematic) type LCD, a VA (Vertical Alignment) type LCD, and an IPS (In-Plane Switching) type LCD; a ½ wavelength plate; a ¼ wavelength plate; an inverse wavelength dispersion property film; an optical compensation film; a color filter; a laminate film including a polarizing plate; and a polarizing plate compensation film. The scope of the present invention is not limited thereto, and may be enlarged as long as a birefringence characteristic of $R_{th}$ that is larger than 0 is required.

In particular, the retardation film which is produced by using the method according to the present invention is usefully applied to an IPS type liquid crystal display containing liquid crystal having the positive dielectric anisotropy to improve a viewing angle characteristic.

The liquid crystal display which comprises one or more retardation films containing the block copolymer will be described with reference to FIG. 1.

In the liquid crystal display which comprises a liquid crystal cell 6 and a first polarizing plate 11 and a second polarizing plate 12 provided on both sides of the liquid crystal cell, the retardation film may be provided between the liquid crystal cell 6 and the first polarizing plate 11 and/or the second polarizing plate 12. FIG. 1 illustrates the retardation film which is provided between the first polarizing plate 11 and the liquid crystal cell 6. However, one or more retardation films may be provided between the second polarizing plate 12 and the liquid crystal cell 6, or between the first polarizing plate 11 and the liquid crystal cell 6 and between the second polarizing plate 12 and the liquid crystal cell 6.

In addition, FIG. 1 illustrates a backlight which is provided on the second polarizing plate. However, the backlight may be provided on the first polarizing plate.

The first polarizing plate 11 and the second polarizing plate 12 may comprise a protective film on a side or both sides thereof. Examples of the inner protective film may include, but are not limited to a triacetate cellulose (TAC) film, a polynorbonene film which is produced by using ring opening metathesis polymerization (ROMP), a HROMP (ring opening metathesis polymerization followed by hydrogenation) polymer film which is produced by using hydrogenation of a ring-opened cyclic olefin polymer, a polyester film, and a polynorbonene film which is produced by using addition polymerization. Additionally, a film which is made of a transparent polymer material may be used as a protective film. However, examples of the protective film are not limited thereto.

In addition, a polarizing film is included in the present invention, and the present invention provides an integrated polarizing plate comprising a retardation film as the protective film. The retardation film comprises a block copolymer that comprises a vinyl polymer block containing styrene or a derivative thereof, and a polydimethylsiloxane block on a side or both sides of the polarizing film.

If the retardation film is provided on only one side of the polarizing film, a protective film which is known in the related art may be provided on another side thereof.

Examples of the polarizing film may include a film which contains iodine or dichromatic dyes and is made of polyvinyl alcohol (PVA). The polarizing film may be produced by applying iodine or dichromatic dyes on the PVA film. However, the production method of the polarizing plate is not limited. In the specification, the polarizing film does not include the protective film, and the polarizing plate includes the polarizing film and the protective film.

In the integrated polarizing plate according to the present invention, the protective film and the polarizing film may be combined with each other by using a method known in the art.

For example, the combination of the protective film and the polarizing film may be performed according to an attachment method using an adhesive. That is, the adhesive is applied on the surface of the protective film of the polarizing film or the PVA film that is the polarizing film or the polarizing film by using a roll coater, a gravure coater, a bar coater, a knife coater, a capillary coater, or the like. Before the adhesive is completely dried, the protective film and the polarizing film are combined with each other using heat pressing or pressing at normal temperature by means of a combination roll. When a hot melt type adhesive is used, the heat pressing roll is used.

Examples of the adhesive which is capable of being used to combine the protective film and the polarizing plate include, but are not limited to a one- or two-liquid type PVA adhesive, a polyurethane adhesive, an epoxy adhesive, a styrene-butadiene rubber (SBR) adhesive, or a hot melt adhesive. If the polyurethane adhesive is to be used, it is preferable to use the polyurethane adhesive produced by using an aliphatic isocyanate compound which does not cause yellowing due to light. If an one- or two-liquid type dry laminate adhesive or an adhesive having relatively low reactivity in respects to isocyanate and a hydroxy group is used, a solution type adhesive which is diluted with an acetate solvent, a ketone solvent, an ether solvent, or an aromatic solvent may be used. In this connection, it is preferable that the adhesive have low viscosity of 5,000 cps or less. Preferably, the adhesive has excellent storage stability and light transmittance of 90% or more at a wavelength of 400 to 800 nm.

Any adhesive may be used as long as the adhesive has desirable adhesion strength. It is preferable that the adhesive be sufficiently cured by heat or ultraviolet rays after the combination so that mechanical strength required in the adhesive is ensured, and interfacial adhesion strength is large so that stripping does not occur as long as any one of both sides of the film to which the adhesive is attached is not destroyed.

Specific examples of the adhesive may include natural rubber, synthetic rubber, elastomer, a vinyl chloride/vinyl acetate copolymer, polyvinyl alkyl ether, polyacrylate, or denatured polyolefin adhesive, and a curable adhesive containing a curing agent such as isocyanate, which have excellent optical transparency.

In addition, the present invention provides a liquid crystal display comprising the integrated polarizing plate.

The liquid crystal display comprising the integrated polarizing plate will be described with reference to FIG. 2. The retardation film 4 is provided between the polarizing film 2 of the first polarizing plate 11 and the liquid crystal cell 6. In this connection, the backlight is adjacent to the second polarizing plate 12 and an observer is adjacent to the first polarizing plate 11, but they are not limited thereto. In the liquid crystal display which comprises the liquid crystal cell 6 and the first polarizing plate 11 and the second polarizing plate 12 provided on both sides of the liquid crystal cell 6, the first polarizing plate 11, the second polarizing plate 12, or both the first polarizing plate 11 and the second polarizing plate 12 may be the integrated polarizing plate according to the present invention.

FIG. 2 illustrates the retardation film which is provided between the polarizing film 2 of the first polarizing plate 11 and the liquid crystal cell 6. However, the retardation film may be provided between the polarizing film 8 of the second polarizing plate 12 and the liquid crystal cell 6, or between the polarizing film 2 of the first polarizing plate 11 and the liquid crystal cell 6 and between the polarizing film 8 of the second polarizing plate 12 and the liquid crystal cell 6. One or more retardation films may be provided on one side or both sides of the polarizing film.

As shown in FIG. 3, the retardation film 4 is provided between the polarizing film 2 of the first polarizing plate 11 and the liquid crystal cell 6. In this connection, the backlight is adjacent to the first polarizing plate 11 and an observer is adjacent to the second polarizing plate 12, but they are not limited thereto.

If the liquid crystal display according to the present invention comprises the integrated polarizing plate, one or more retardation films according to the present invention may be additionally provided between the polarizing plate and the liquid crystal cell.

MODE FOR THE INVENTION

A better understanding of the present invention may be obtained in light of the following Examples which are set forth to illustrate, but are not to be construed to limit the present invention.

EXAMPLE

<Preparation of the Macroinitiator>

1) Preparation of the Polydimethylsiloxane Macroinitiator I 32 g of 1,13-bisphenol-polydimethylsiloxane (Mn=3,500) was dissolved in 50 g of chloroform, 2.1 g of triethylamine was then added thereto, and the agitation was performed at room temperature for 5 min. Next, cooling water at 5° C. was provided, and the solution in which 3 g of azobis-4-cyanopentanoyl chloride was dissolved in 50 g of chloroform was dropped for 30 min to perform the reaction. After the reaction was performed for 24 hours, methanol was poured to wash the byproducts and the unreacted substances. Next, the drying was performed under reduced pressure to obtain 30 g of the macroinitiator I (Mn=32,000, PDI=2.0).

2) Preparation of the Polydimethylsiloxane Macroinitiator II 32 g of denatured silicone having amine at both ends thereof (trademark: KF-8008, manufactured by Shinetsu, Co., Ltd., Mn=5,700) was dissolved in 50 g of chloroform, 2.1 g of triethylamine was then added thereto, and the agitation was performed at room temperature for 5 min. Next, cooling water at 5° C. was provided, and the solution in which 3 g of azobis-4-cyanopentanoyl chloride was dissolved in 50 g of chloroform was dropped for 30 min to perform the reaction. After the reaction was performed for 24 hours, methanol was poured to wash the byproducts and the unreacted substances. Next, the drying was performed under reduced pressure to obtain 32 g of the macroinitiator II (Mn=60,000, PDI=2.2).

3) Preparation of the Polydimethylsiloxane Macroinitiator III 50 g of denatured silicone having amine at both ends thereof (trademark: FLUID NH130D, manufactured by Wacker, Co., Ltd., Mn=10,000) was dissolved in 60 g of chloroform, 1.2 g of triethylamine was then added thereto, and the agitation was performed at room temperature for 5 min. Next, cooling water at 5° C. was provided, and the solution in which 1.55 g of azobis-4-cyanopentanoyl chloride was dissolved in 50 g of chloroform was dropped for 30 min to perform the reaction. After the reaction was performed for 24 hours, methanol was poured to wash the byproducts and the unreacted substances. Next, the drying was performed under reduced pressure to obtain 32 g of the macroinitiator III (Mn=70,000, PDI=1.9).

<Preparation of the Block Copolymer>

Example 1

2 g of the prepared macroinitiator I, 4 g of acrylonitrile (AN), and 16 g of styrene (SM) were added to a 100 mL flask having an agitating device at 90° C. to initiate the polymerization. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 13 g of white precipitate. The glass transition temperature which was measured by using a DSC (Differential Scanning Calorimeter) was 115° C., and the polystyrene reduced weight average molecular weight which was measured by using a GPC (Gel Permeation Chromatography) was 316,000.

Example 2

2 g of the prepared macroinitiator II, 2 g of acrylonitrile (AN), and 18 g of styrene (SM) were added to a 100 mL flask having an agitating device at 90° C. to initiate the polymerization. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 13 g of white precipitate. The glass transition temperature which was measured by using a DSC (Differential Scanning Calorimeter) was 110° C., and the polystyrene reduced weight average molecular weight which was measured by using a GPC (Gel Permeation Chromatography) was 250,000.

Example 3

2 g of the prepared macroinitiator I, and 20 g of styrene (SM) were added to a 100 mL flask having an agitating device at 90° C. to initiate the polymerization. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 13 g of white precipitate. The glass transition temperature which was measured by using a DSC (Differential Scanning Calorimeter) was 107° C., and the polystyrene reduced weight average molecular weight which was measured by using a GPC (Gel Permeation Chromatography) was 190,000.

Examples 4 to 7

The polymerization was performed under the same condition as Example 3, with the exception of the polymerization composition of the following Table 1.

TABLE 1

| | Monomer (g) | | Initiator (g) | | Polymer obtained after polymerization (g) |
|---|---|---|---|---|---|
| | Styrene | Acrylonitrile | Macroinitiator II | Macroinitiator III | |
| Example 4 | 30 | — | 3 | — | 19 |
| Example 5 | 40 | — | — | 3 | 28 |
| Example 6 | 25 | 2 | 3 | — | 21 |
| Example 7 | 38 | 12 | — | 4 | 30 |

Example 8

2 g of the prepared macroinitiator I, 20 g of styrene (SM), 0.32 g of TEMPO, and 0.6 g of acetic anhydride were added to a 100 mL flask having an agitating device at 90° C. to initiate the polymerization at 130° C. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 15 g of white precipitate. The glass transition temperature which was measured by using a DSC (Differential Scanning Calorimeter) was 115° C., and the polystyrene reduced weight average molecular weight which was measured by using a GPC (Gel Permeation Chromatography) was 222,000.

Example 9

2 g of the prepared macroinitiator I, 16 g of styrene (SM), 4 g of acrylonitrile (AN), 0.32 g of TEMPO, and 0.6 g of acetic anhydride were added to a 100 mL flask having an agitating device to initiate the polymerization at 130° C. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 15 g of white precipitate. The glass transition temperature which was measured by using a DSC (Differential Scanning Calorimeter) was 115° C., and the polystyrene reduced weight average molecular weight which was measured by using a GPC (Gel Permeation Chromatography) was 202,000.

Example 10

2 g of the prepared macroinitiator II, 20 g of styrene (SM), 0.28 g of TEMPO, and 0.55 g of acetic anhydride were added to a 100 mL flask having an agitating device to initiate the polymerization at 130° C. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 15 g of white precipitate. The glass transition temperature which was measured by using a DSC (Differential Scanning Calorimeter) was 115° C., and the polystyrene reduced weight average molecular weight which was measured by using a GPC (Gel Permeation Chromatography) was 190,000.

Example 11

2 g of the prepared macroinitiator II, 16 g of styrene (SM), 4 g of acrylonitrile (AN), 0.28 g of TEMPO, and 0.5 g of acetic anhydride were added to a 100 mL flask having an agitating device to initiate the polymerization at 130° C. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 15 g of white precipitate. The glass transition temperature which was measured by using a DSC (Differential Scanning Calorimeter) was 115° C., and the polystyrene reduced weight average molecular weight which was measured by using a GPC (Gel Permeation Chromatography) was 182,000.

Example 12

15 g of the prepared macroinitiator I, 76 g of styrene (SM), 24 g of acrylonitrile (AN), 5 g of bis(1-oxyl-2,2,6,6-tetramethylpiperidine-4-yl) sebacate (CIBA product), and 1.2 g of acetic anhydride were added to a 250 mL flask having an agitating device to initiate the polymerization at 130° C. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 15 g of white precipitate. The glass transition temperature which was measured by using a DSC (Differential Scanning Calorimeter) was 115° C., and the polystyrene reduced weight average molecular weight which was measured by using a GPC (Gel Permeation Chromatography) was 290,000.

Example 13

15 g of the prepared macroinitiator III, 100 g of styrene (SM), 2.3 g of bis(1-oxyl-2,2,6,6-tetramethylpiperidine-4-yl) sebacate (CIBA product), and 5 g of acetic anhydride were added to a 250 mL flask having an agitating device to initiate the polymerization at 130° C. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 15 g of white precipitate. The glass transition temperature which was measured by using a DSC (Differential Scanning Calorimeter) was 115° C., and the polystyrene reduced weight average molecular weight which was measured by using a GPC (Gel Permeation Chromatography) was 300,000.

Comparative Example 1

0.2 g of AIBN (azobis(isobutyronitrile)), and 20 g of styrene (SM) were added to a 100 mL flask having an agitating device at 90° C. to initiate the polymerization. After 18 hours, dilution was performed by using 100 mL of THF (tetrahydrofuran) to stop the reaction. The resulting solution was continuously agitated at normal temperature to be completely dissolved, slowly dropped onto an excessive amount of methanol, and dried to produce 18 g of white precipitate. The glass transition temperature which was measured by using a DSC (Differential Scanning Calorimeter) was 100° C., and the polystyrene reduced weight average molecular weight which was measured by using a GPC (Gel Permeation Chromatography) was 270,000.

<Preparation of the Optical Film>

7.5 g of block copolymer was added to 42.5 g of dichloroethane, and the solution which was prepared by performing the agitation at 30° C. for 24 hours was filtered by using a 5 μm filter to prepare a 15 wt % casting solution from which insoluble substances and dust were removed. The casting solution was poured on the glass plate for LCD substrates, subjected to casting by using the doctor blade at a speed of 0.3 m/min, and dried at room temperature for 60 min, at 60° C. for 60 min, and at 115° C. for 90 min to remove the solvent and strip the polymer film.

The thickness of the produced optical film, the total transmittance and the haze are described in the following Table 2. The total transmittance and the haze were measured by using HR-100 manufactured by MURAKAMI COLOR RESEARCH LABORATORY, Corp. three times, and average values were used as the results.

In addition, the toughness of the produced optical film was evaluated by using the degree of breaking of the film when the film was folded by hands at an angle of 180°. In respects to the characteristics of the produced optical film, the term "tough" means that the film was not broken even though the film was folded at an angle of 180°. In respects to the characteristics of the produced optical film, the term "brittle" means that the film was broken even though the film was folded at an angle of 180°.

TABLE 2

| Block copolymer | Film thickness (μm) | Total transmittance (%) | Haze (%) | Toughness |
|---|---|---|---|---|
| Example 1 | 80 | 93 | 0.5 | Tough |
| Example 2 | 75 | 90 | 0.75 | Tough |
| Example 3 | 65 | 91 | 0.68 | Tough |
| Example 4 | 80 | 91 | 0.5 | Tough |
| Example 5 | 78 | 92 | 0.4 | Tough |
| Example 6 | 85 | 92 | 0.5 | Tough |
| Example 7 | 90 | 91 | 0.45 | Tough |
| Example 8 | 80 | 93 | 0.5 | Tough |

TABLE 2-continued

| Block copolymer | Film thickness (μm) | Total transmittance (%) | Haze (%) | Toughness |
|---|---|---|---|---|
| Example 9 | 80 | 90 | 0.75 | Tough |
| Example 10 | 74 | 91 | 0.68 | Tough |
| Example 11 | 75 | 91 | 0.7 | Tough |
| Example 12 | 80 | 91 | 0.8 | Tough |
| Example 13 | 80 | 92 | 0.6 | Tough |
| Comparative Example 1 | 85 | 93 | 0.3 | Brittle |

<Preparation of the Retardation Film>

The retardation film was produced by using the optical film to measure optical properties thereof. The measurement results of the stretching condition, the in-plane retardation value, and the thickness retardation value are described in the following Table 3.

The in-plane retardation value and the thickness retardation value of the retardation film were measured by using the following procedure.

In respects to the thickness retardation value, Kobra 21-ADH (trademark) which was manufactured by OJI Scientific Instruments Co., Ltd. was used. The direction in which the refractive index was highest in a plane direction at 590 nm was considered an x axis, the direction which was perpendicular to the x axis in the plane direction was considered an y axis, and the direction which was perpendicular to the xy plane was considered a z axis. $n_x$, $n_y$, and $n_z$ which were the refractive indices in respects to the directions were measured at 590 nm, the thickness of the film layer was measured to measure $n_x$, $n_y$, and $n_z$ which were the refractive indices in respects to the axis directions. Next, the thickness retardation value and the in-plane retardation value of the film were calculated by using the following Equations 1 and 2.

$$R_{th} = (n_z - n_y) \times d \quad \text{[Equation 1]}$$

In Equation 1, $n_x$ is the refractive index in the direction in which the refractive index is highest in respects to the plane of the film, $n_y$ is the refractive index in the transverse direction in respects to $n_x$ in the plane, $n_z$ is the refractive index in the direction which is perpendicular in respects to the plane of the film, d is the thickness of the film, and $R_{th}$ is the thickness retardation value.

$$R_{in} = (n_x - n_y) \times d \quad \text{[Equation 2]}$$

In Equation 2, $n_x$ is the refractive index in the direction in which the refractive index is highest in respects to the plane of the film, $n_y$ is the refractive index in the transverse direction in respects to $n_x$ in the plane, d is the thickness of the film, and $R_{in}$ is the in-plane retardation value.

In addition, the stretching ratio was defined by the following Equation 3.

Stretching ratio (%)=[(length of sample after stretching−length of sample before stretching)/length of sample before stretching]×100    [Equation 3]

TABLE 3

| Block copolymer | Stretching temperature (° C.) | Stretching ratio (%) | Stretching speed (mm/min) | Film thickness (μm) | In-plane retardation value ($R_{in}$, nm) | Thickness retardation value ($R_{th}$, nm) |
|---|---|---|---|---|---|---|
| Example 1 | 110 | 25 | 50 | 79 | 153 | 196 |
| | 110 | 50 | 50 | 70 | 290 | 310 |
| | 110 | 100 | 50 | 63 | 420 | 480 |
| Example 2 | 115 | 50 | 50 | 72 | 250 | 240 |
| | 115 | 100 | 50 | 70 | 400 | 400 |
| | 115 | 150 | 50 | 63 | 500 | 400 |

TABLE 3-continued

| Block copolymer | Stretching temperature (° C.) | Stretching ratio (%) | Stretching speed (mm/min) | Film thickness (μm) | In-plane retardation value ($R_{in}$, nm) | Thickness retardation value ($R_{th}$, nm) |
|---|---|---|---|---|---|---|
| Example 3 | 110 | 50 | 50 | 60 | 280 | 350 |
|  | 110 | 100 | 50 | 47 | 400 | 360 |
| Example 8 | 110 | 25 | 50 | 79 | 190 | 235 |
|  | 110 | 50 | 50 | 76 | 363 | 424 |
| Example 9 | 115 | 50 | 50 | 72 | 300 | 350 |
|  | 115 | 100 | 50 | 68 | 360 | 430 |
| Example 10 | 115 | 50 | 50 | 70 | 330 | 370 |
|  | 115 | 100 | 50 | 65 | 370 | 450 |
| Example 11 | 115 | 50 | 50 | 70 | 325 | 395 |
|  | 115 | 100 | 50 | 66 | 360 | 450 |
| Example 12 | 115 | 50 | 50 | 77 | 360 | 420 |
|  | 115 | 100 | 50 | 73 | 370 | 460 |
| Example 13 | 115 | 50 | 50 | 79 | 360 | 480 |
|  | 115 | 100 | 50 | 74 | 390 | 475 |

The invention claimed is:

1. A retardation film consisting essentially of:
a block copolymer comprising a vinyl polymer block containing styrene or a derivative thereof, and a polydimethylsiloxane block,
wherein a weight ratio of the polydimethylsiloxane block and the vinyl polymer block is in the range of 3:20 to 3:40,
wherein the styrene or a derivative thereof is represented by the following Formula 1:

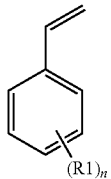

[Formula 1]

wherein R1s may be same or different from each other and are each independently a hydrocarbon radical selected from alkyl having 1 to 20 carbon atoms or halogen and n is an integer in the range of 0 to 5,
wherein the styrene or the derivative thereof is comprised in an amount in the range of 50 to 100 mol % in the vinyl polymer block,
wherein the block copolymer is a A-(B-A)$_p$-B type or a A-(B-A)$_m$ type, in which A is the polydimethylsiloxane block, B is the vinyl polymer block, in which p is an integer in the range of 0 to 3, and m is an integer in the range of 1 to 3,
wherein a thickness retardation value ($R_{th}$) of the retardation film measured at 590 nm and calculated by Equation 1 is in the range of 196 to 480 nm and an in-plane retardation value ($R_{in}$) measured at 590 nm and calculated by Equation 2 is in the range of 153 to 500 nm, $$R_{th}=(n_z-n_y)\times d \quad \text{[Equation 1]}$$

$$R_{in}=(n_x-n_y)\times d \quad \text{[Equation 2]}$$

wherein the $n_x$ is the refractive index in the direction in which the refractive index is highest in respects to the plane of the retardation film, the $n_y$ is the refractive index in the transverse direction in respects to the nx in the plane, the $n_z$ is the refractive index in the direction which is perpendicular in respects to the plane of the retardation film and the d is the thickness of the retardation film,
wherein the retardation film is an uniaxially or biaxially stretched film, and
wherein the retardation film does not break when folded 180 degrees.

2. The retardation film according to claim 1, wherein the vinyl polymer block further comprises one or more comonomers selected from the group consisting of a (meth)acrylic ester compound, a vinyl cyanide compound, and a maleimide compound.

3. The retardation film according to claim 1, wherein the polydimethylsiloxane block comprises a compound that is represented by the following Formula 2:

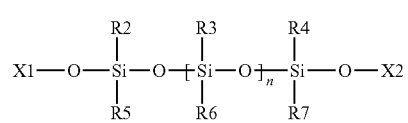

[Formula 2]

wherein R2, R3, R4, R5, R6, and R7 are same or different from each other, and are each independently alkyl having 1 to 12 carbon atoms, arylalkyl having 6 to 12 carbon atoms, or aryl having 6 to 12 carbon atoms,
X1 and X2 are same or different from each other, and are each independently alkyl having 1 to 12 carbon atoms, arylalkyl having 6 to 12 carbon atoms, or aryl having 6 to 12 carbon atoms, and
q is an integer of 1 or more.

4. The retardation film according to claim 3, wherein X1 and X2 of Formula 2 are further bonded to an end group that is selected from the group consisting of hydroxy, amine, isocyanate, and epoxy.

5. A liquid crystal display comprising:
one or more retardation films according to claim 1.

6. A retardation film consisting essentially of:
a block copolymer comprising a vinyl polymer block containing styrene or a derivative thereof, and a polydimethylsiloxane block; and
a compound including a nitroxide radical,
wherein a weight ratio of the polydimethylsiloxane block and the vinyl polymer block is in the range of 3:20 to 3:40, wherein the styrene or a derivative thereof is represented by the following Formula 1:

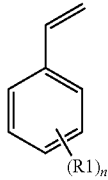

[Formula 1]

wherein R1s may be same or different from each other and are each independently a hydrocarbon radical selected from alkyl having 1 to 20 carbon atoms or halogen and n is an integer in the range of 0 to 5, wherein the styrene or the derivative thereof is comprised in an amount in the range of 50 to 100 mol % in the vinyl polymer block, wherein the block copolymer is a A-(B-A)$_p$-B type or a A-(B-A)$_m$ type, in which A is the polydimethylsiloxane block, B is the vinyl polymer block, in which p is an integer in the range of 0 to 3, and m is an integer in the range of 1 to 3, wherein a thickness retardation value ($R_{th}$) of the retardation film measured at 590 nm and calculated by Equation 1 is in the range of 196 to 480 nm and an in-plane retardation value ($R_{in}$) measured at 590 nm and calculated by Equation 2 is in the range of 153 to 500 nm, $$R_{th}=(n_z-n_y)\times d \qquad \text{[Equation 1]}$$

$$R_{in}=(n_x-n_y)\times d \qquad \text{[Equation 2]}$$

wherein the $n_x$ is the refractive index in the direction in which the refractive index is highest in respects to the plane of the retardation film, the $n_y$ is the refractive index in the transverse direction in respects to the nx in the plane, the $n_z$ is the refractive index in the direction which is perpendicular in respects to the plane of the retardation film and the d is the thickness of the retardation film, wherein the retardation film is an uniaxially or biaxially stretched film, and wherein the retardation film does not break when folded 180 degrees.

7. The retardation film according to claim 6, wherein the compound that includes the nitroxide radical is TEMPO (2,2,6,6-tetramethylpiperidine-1-oxyl), MTEMPO (2,2,4,6,6-pentamethylpiperidine-1-oxyl), or a compound that is represented by the following Formula 3:

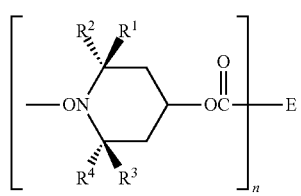

[Formula 3]

wherein r is 1, 2, 3 or 4, $R^1$, $R^2$, $R^3$, and $R^4$ may be same or different from each other, and are each independently methyl or ethyl, or $R^1$ and $R^2$, or $R^3$ and $R^4$ may form pentamethylene, when r is 1, E is $C_1$~$C_{19}$ alkyl, $C_2$~$C_{17}$ alkenyl, phenyl, or phenyl in which 1 to 3 $C_1$~$C_4$ alkyls are substituted, when r is 2, E is $C_2$~$C_{12}$ alkylene, ortho phenylene, metal phenylene, or para phenylene, when r is 3, E is $C_3$~$C_7$ alkanetriyl, 1,2,4-benzenetriyl, or 1,3,5-benzenetriyl, and when r is 4, E is $C_4$~$C_8$ alkanetetrayl, or 1,2,4,5-benzenetetrayl.

8. An integrated polarizing plate comprising:

a polarizing film;

a retardation film that consists essentially of a block copolymer comprising a vinyl polymer block containing styrene or a derivative thereof, and a polydimethylsiloxane block on a side or both sides of the polarizing film as a protective film, wherein a weight ratio of the polydimethylsiloxane block and the vinyl polymer block is in the range of 3:20 to 3:40, wherein the styrene or a derivative thereof is represented by the following Formula 1:

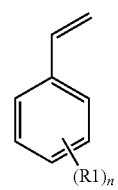

[Formula 1]

wherein R1s may be same or different from each other and are each independently a hydrocarbon radical selected from alkyl having 1 to 20 carbon atoms or halogen and n is an integer in the range of 0 to 5, wherein the styrene or the derivative thereof is comprised in an amount in the range of 50 to 100 mol % in the vinyl polymer block, wherein the block copolymer is a A-(B-A)$_p$-B type or a A-(B-A)$_m$ type, in which A is the polydimethylsiloxane block, B is the vinyl polymer block, in which p is an integer in the range of 0 to 3, and m is an integer in the range of 1 to 3, wherein a thickness retardation value ($R_{th}$) of the retardation film measured at 590 nm and calculated by Equation 1 is in the range of 196 to 480 nm and an in-plane retardation value ($R_{in}$) measured at 590 nm and calculated by Equation 2 is in the range of 153 to 500 nm, $$R_{th}=(n_z-n_y)\times d \qquad \text{[Equation 1]}$$

$$R_{in}=(n_x-n_y)\times d \qquad \text{[Equation 2]}$$

wherein the $n_x$ is the refractive index in the direction in which the refractive index is highest in respects to the plane of the retardation film, the $n_y$ is the refractive index in the transverse direction in respects to the nx in the plane, the $n_z$ is the refractive index in the direction which is perpendicular in respects to the plane of the retardation film and the d is the thickness of the retardation film, wherein the retardation film is an uniaxially or biaxially stretched film, and wherein the retardation film does not break when folded 180 degrees.

9. A liquid crystal display comprising:
a liquid crystal cell; and
a first polarizing plate and a second polarizing plate provided on both sides of the liquid crystal cell respectively,
wherein the first polarizing plate, the second polarizing plate, or both the first polarizing plate and the second polarizing plate are the integrated polarizing plate of claim 8.

\* \* \* \* \*